US005608487A

United States Patent [19]

Pierce et al.

[11] Patent Number: 5,608,487

[45] Date of Patent: Mar. 4, 1997

[54] METHOD AND APPARATUS FOR SEPARATING A LEADER CARD FROM A FILMSTRIP

[75] Inventors: Brett A. Pierce, Nunda; Fred C. Penta; Joseph A. Manico, both of Rochester, all of N.Y.

[73] Assignee: Eastman Kodak Company, Rochester, N.Y.

[21] Appl. No.: 563,696

[22] Filed: Nov. 28, 1995

[51] Int. Cl.$^6$ .................................................. G03B 13/10

[52] U.S. Cl. ........................... 396/564; 156/584; 396/661

[58] Field of Search ............................ 354/298, 319–324, 354/354, 247; 156/384, 577, 584

[56] References Cited

U.S. PATENT DOCUMENTS 4,560,087 12/1985 Sato et al. .............................. 156/584

*Primary Examiner*—D. Rutledge
*Attorney, Agent, or Firm*—Frank Pincelli

[57] ABSTRACT

A method and apparatus for separating a leader card from a strip of film that has been adhesively secured to the leader card by a strip of adhesive tape at one end of the leader card. The apparatus includes at least one scraper blade having a scraping edge. The blade is mounted to the apparatus so that the scraping edge of the blade is biased against the surface of the leader card such that when the leader card is moved past the scraping edge, the adhesive tape will be removed from the leader card.

22 Claims, 6 Drawing Sheets

METHOD AND APPARATUS FOR SEPARATING A LEADER CARD FROM A FILMSTRIP

FIELD OF THE INVENTION

The present invention is directed to a method and apparatus for removing a leader card from a filmstrip that has been secured to the leader card by an adhesive tape.

BACKGROUND OF THE INVENTION

Many minilab type film processors use a plastic leader card to pull one or more filmstrips through the processor. The filmstrips are attached to the leader cards with a very tenacious plastic adhesive tape. After the film has been processed and the leader card and filmstrips have exited the film processor, an operator removes the filmstrips from the leader card by cutting them close to the leader card. The tape strips and a residual section of film remain attached to the leader card. Current methods of removing this material from the leader card include using fingers and fingernails, or a small metal wedge-shaped scraper to scrape and pull the tape and film section from the leader card. These techniques are time consuming, subject the operator to risk of injury, and subject the reusable leader card to risk of damage. It is, therefore, desirable to provide a device and method that quickly and easily removes residual film section and tape strips from film processor leader cards with a minimum of effort and without risk of injury to the operator or risk of damage to the leader card. It is toward this end that the present invention is directed.

The present invention provides a method and apparatus which is simple in construction, easy to use, and that removes the tape and attached filmstrip from the leader card in a quick and efficient manner.

SUMMARY OF THE INVENTION

In one aspect of the present invention there is provided an apparatus for separating a leader card from a strip of film that has been adhesively secured to the leader card by a strip of adhesive tape at one end of the leader card. The apparatus includes at least one scraper blade having a scraping edge. The blade is mounted to the apparatus so that the scraping edge of the blade is biased against the surface of the leader card such that when the leader card is moved past the blade, the adhesive tape will be removed from the leader card.

In another aspect of the present invention there is provided a method for separating a leader card from a strip of film that has been adhered to the leader card by an adhesive strip of tape. The apparatus having at least one scraper blade having a scraping edge for placement against the surface of the leader card. The method comprising the steps of:

a) placing the leader card such that the scraping edge is adjacent the surface of the leader card prior to the adhesive tape; and b) pulling the card in a direction such that the scraping edge will remove the adhesive tape from the leader card in a single stroke.

DETAILED DESCRIPTION OF THE INVENTION

Figure 1:
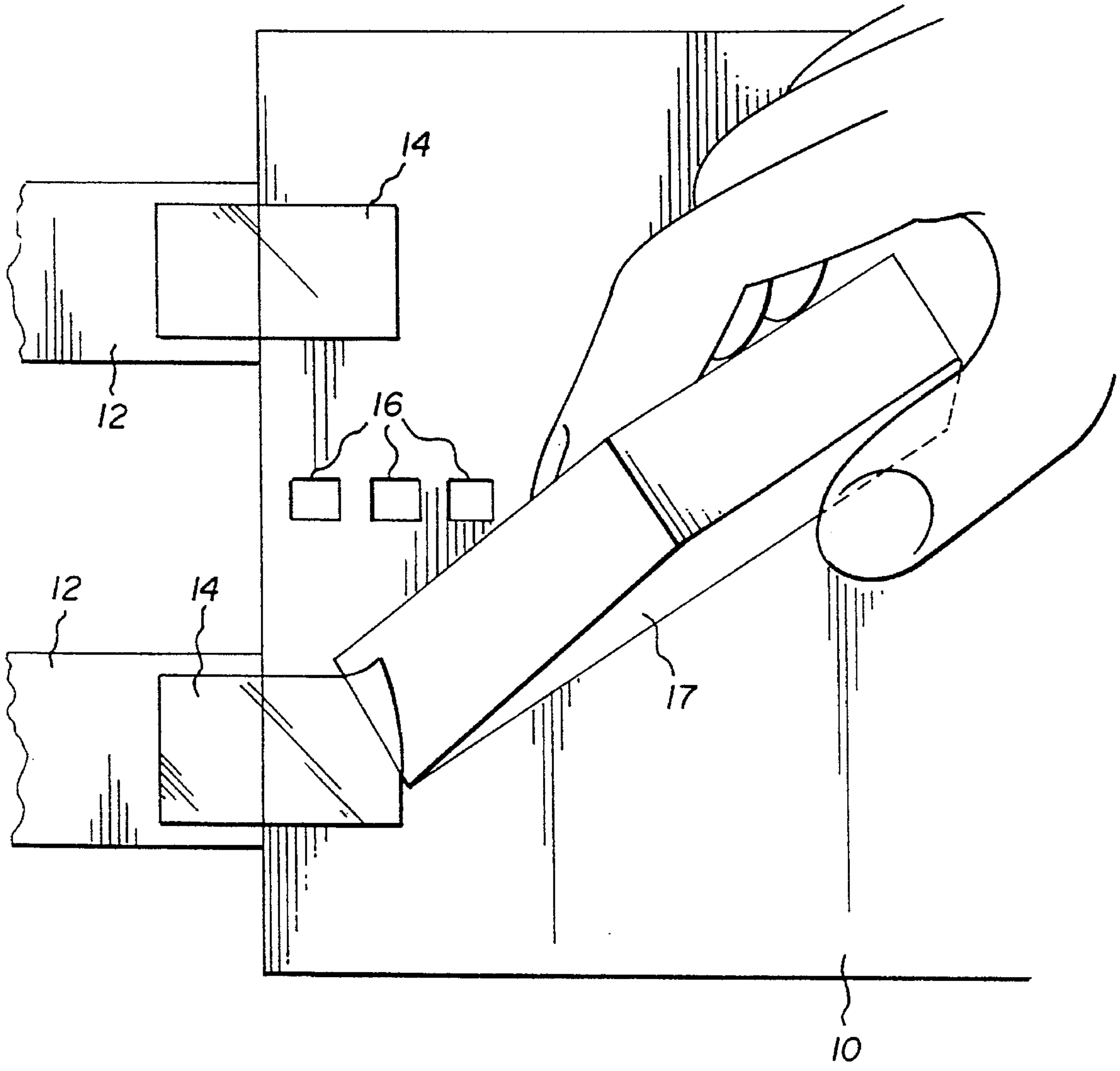
Fig. 1 PRIOR ART
FIG. 1 is a perspective view of a leader card having a pair of strips of film attached thereto illustrating how the strip is removed in the prior art.
Figure 6:
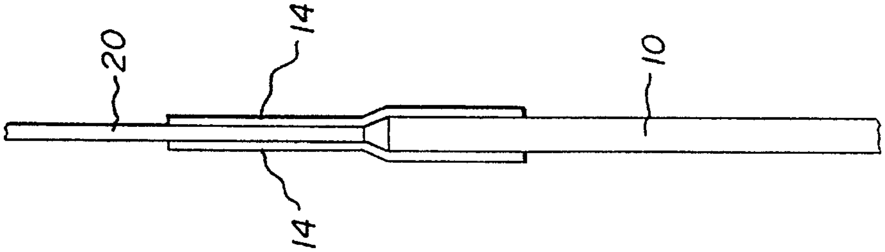
FIG. 6 is an enlarged side elevational view of the end portion of the leader card having the strip of film secured as illustrated in FIG. 2.

Referring to FIG. 1, there is illustrated a current prior art method used to remove photographic filmstrips attached to a film leader card. In particular, there is illustrated a leader card 10 having a pair of strips 12 of photographic film adhered thereto. The filmstrips 12 are secured to leader card 10 by a pair of adhesive tape strips which are secured to both sides of the filmstrip and leader card (such as illustrated in FIG. 6). The leader card 10 is provided with a plurality of cut-out sections 16 which are used to drive the leader card 10 and attached filmstrips 12 through the photo-processing device (such as minilab film/processor). In the prior art, a hand tool 17 would be used to scrape and cut strips of adhesive tape 14 from the leader cards 10. This method is not only time consuming, but also poses a risk of damage to the leader card in addition to potential injury to the user. The same procedure would then have to be repeated for each of the adhesive strips 14 used to adhere the filmstrip to the leader card.

Figure 2:
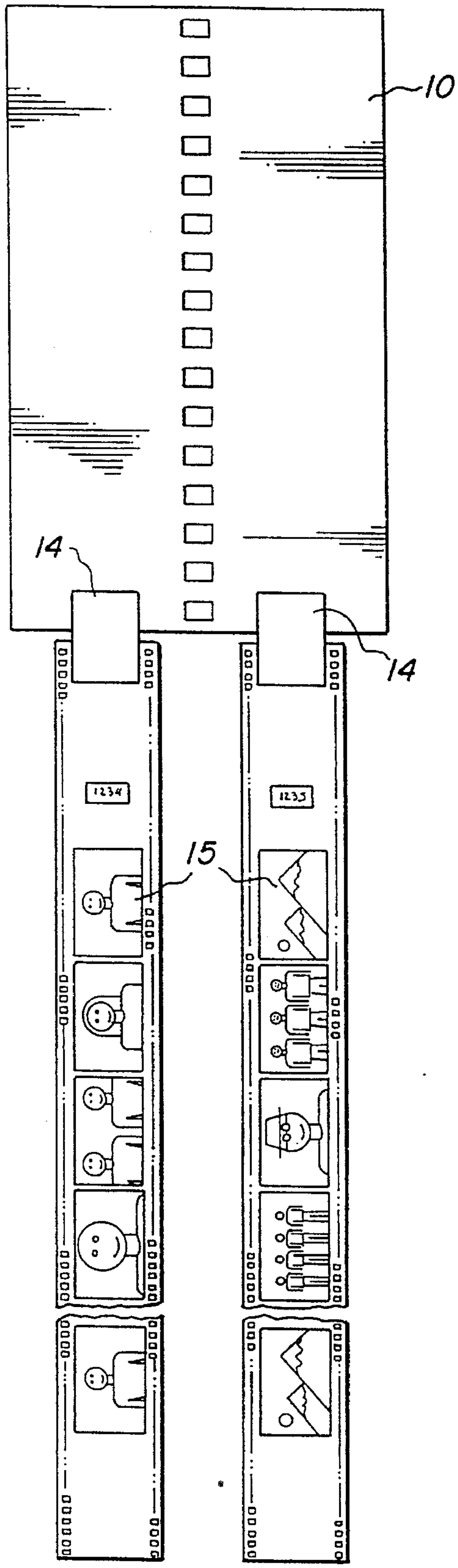
FIG. 2 is an elevational view of a film leader card with two strips of photosensitive film attached with adhesive tape to the leader card.

Referring to FIG. 2, there is illustrated a leader card 10 having a pair of filmstrips 12 secured by cut adhesive strips 14 after the film has been processed through a photographic processor wherein the images 15 on the film have been permanently developed.

Figure 3:
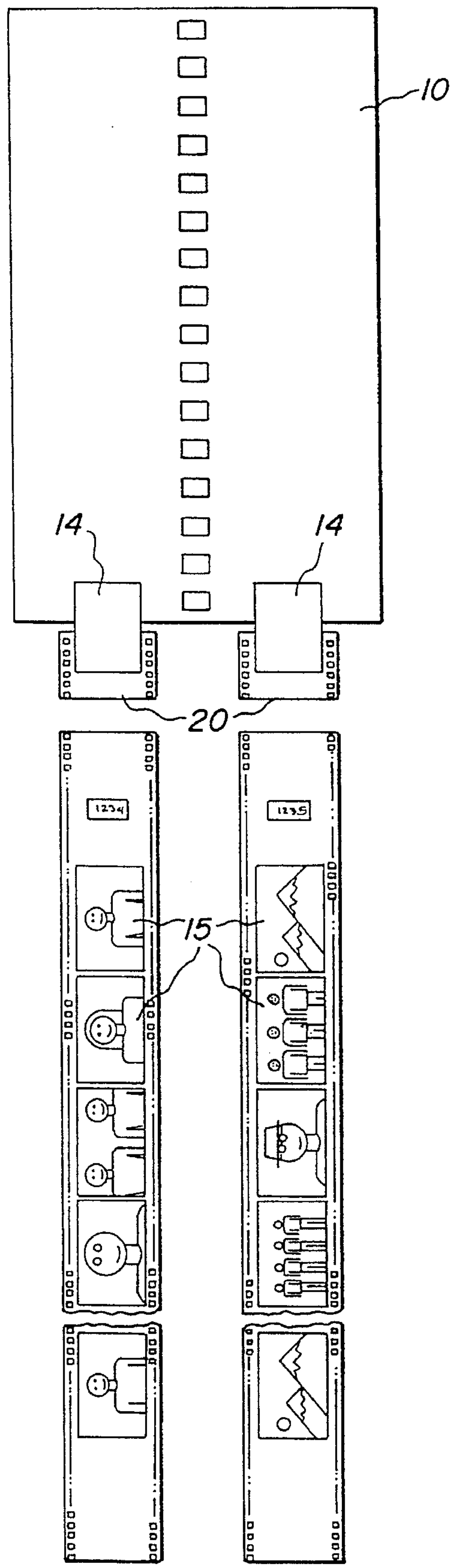
FIG. 3 is a view similar to FIG. 2 illustrating the strip of film having been cut from the leader card.

FIG. 3 illustrates the cutting of the filmstrips 12 from the leader card leaving the terminal ends 20 of each of the filmstrips 12 attached to the leader card. The leader card 10 and attached terminal ends 20 are taken to an apparatus for removing the adhesive strips 14 and attached terminal ends 20 from the leader card 10.

Figure 4:
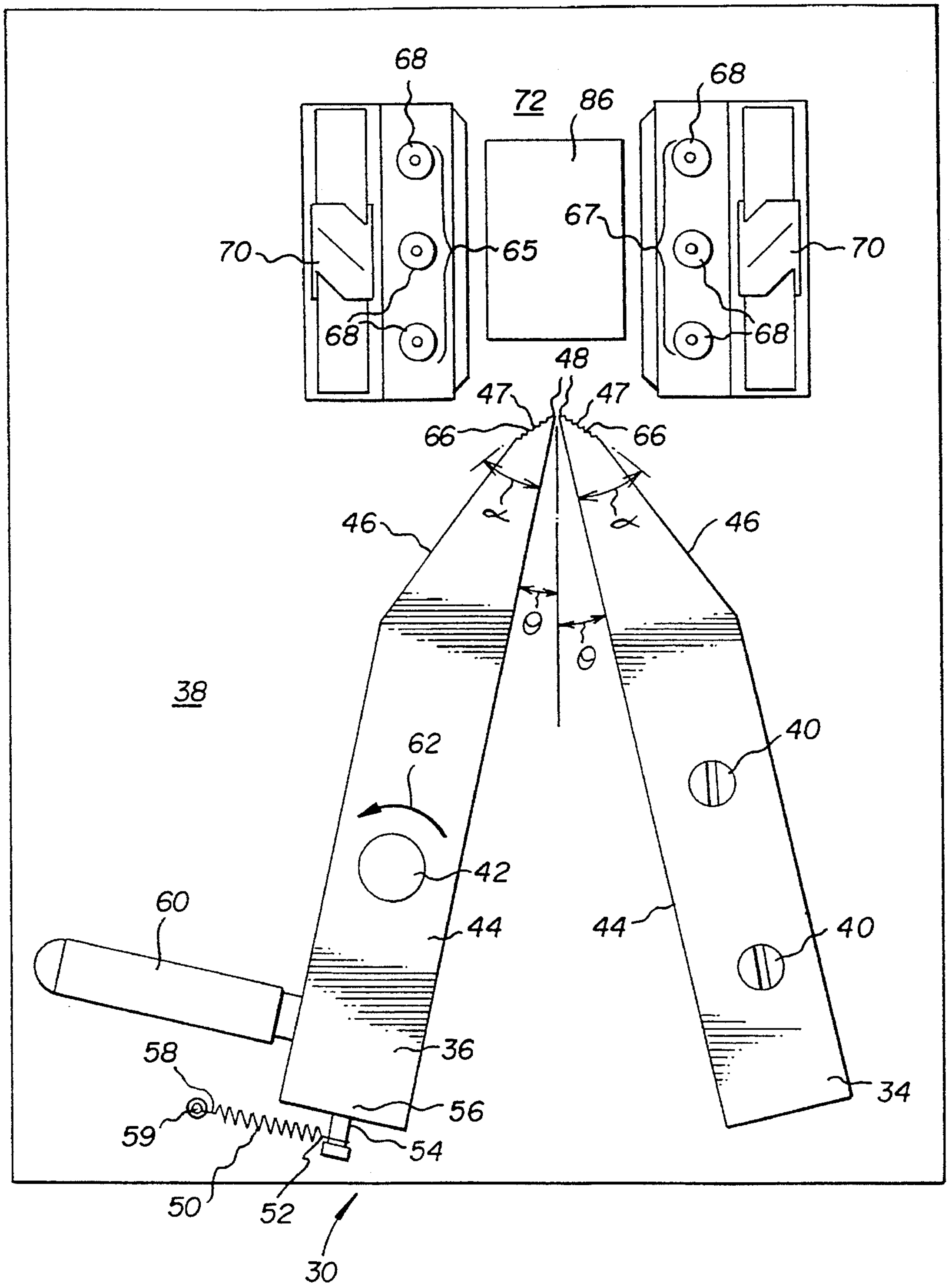
FIG. 4 is a schematic illustration of an apparatus made in accordance with the present invention, which can be used to remove the filmstrip from a leader card.
Figure 5:
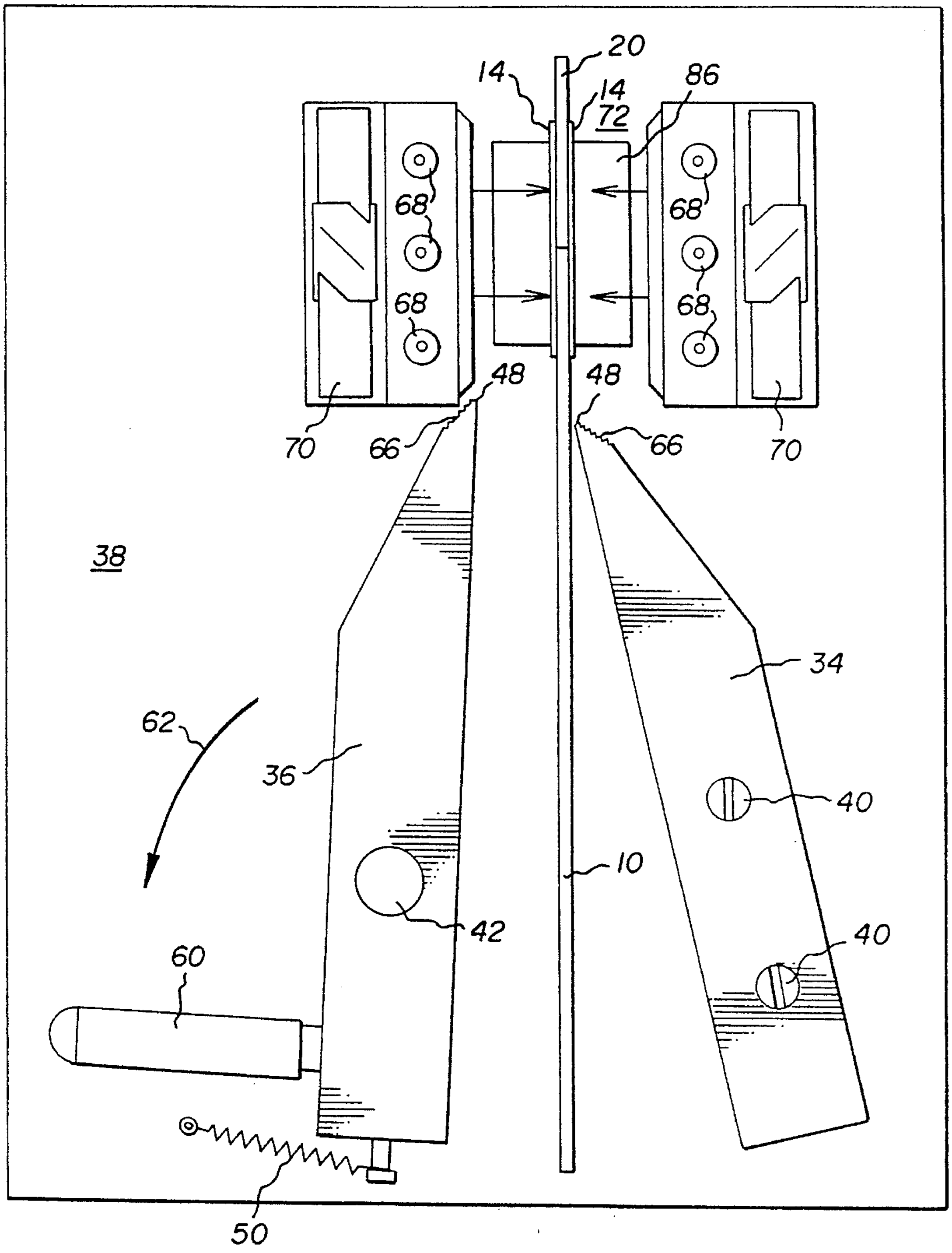
FIG. 5 is a view similar to FIG. 4 illustrating one of the scraper blades moved out of contact with the fixed scraper blade.

Referring to FIG. 4, there is illustrated an apparatus 30 for removing the adhesive strips 14. The apparatus 30 comprises a pair of scraper blades 34,36 which are mounted to a base 38. In the particular embodiment illustrated, the scraper blade 34 is fixably mounted to base 38 by a pair of screws 40 whereas scraper blade 36 is pivotally mounted to base 38 by pivot 42 for movement between an engaged position for removing the strip 14 and an open position (see FIG. 5) for allowing placement of the leader card 10 into the apparatus 30. Each of the scraper blades 34,36 have an outer surface 46 and an inner surface 44. The outer edge 46 has a terminal end section 47 which terminates in a zero degree scraping edge 48 with inner surface 44. The terminal end section 47 and inner surface 44 form an angle $\alpha$ in the range of about 50° to 70°. In the embodiment illustrated, $\alpha$ is about 62°. However, $\alpha$ may be any appropriate angle desired so long as the edge 48 removes the adhesive strip 14. The edge 48 is placed adjacent the surface of the leader card 10 for scraping of the adhesive tape 14 therefrom. The moveable blade 36 is biased against blade 34 such that the scraping edge 48 of each blade 34,36 is in substantial parallel alignment and contact with each other. In the particular embodiment illustrated, the blade 36 is biased by a spring 50, which has one end 52 secured to anchor 54 at the rear end 56 of blade 36. The other end 58 of the spring is secured to base 38 by a screw 59, however, the spring may secured to base 38 by any other fastening means desired. The spring is tensioned so that the scraping edges 48 of blades 34,36 are biased toward each other and provides sufficient force for scraping of the adhesive strip 14 from the leader card 10 as is described later herein. A handle 60 is provided for moving the moveable scraper blade 36 to the open position, as shown in FIG. 5, in the direction about pivot 42, as indicated by arrow 62, so that the blades 34,36 may be spaced apart for allowing placement of the leader card 10 in apparatus 30 as described later herein. The blades 34,36 are oriented with respect to the leader card 10 so that angle of attack $\theta$ is less than about 30°, most preferably, less than about 15°. In the embodiment illustrated $\theta$ is about 7½°. The terminal end section 47 of each of the blades 34,36 adjacent the scraping edge 48 is provided with a plurality of grooves 66 which assist in preventing tape remnants from adhering to the scraper blades 34,36 thereby reducing the amount of pull force needed to remove the adhesive strips 14.

In the embodiment illustrated, the apparatus 30 further includes means for heating of the adhesive strips 14 prior to being passed through the scraper blade 34,36. In the particular embodiment illustrated, heating is provided by two sets 65,67 of heating elements 68 which are spaced apart so that the leader card 10 and attached adhesive strips 14 can be heated prior to being passed through the scraper blades 34,36. A pair of fans 70 are provided, one adjacent each set 65,67 of heating element 68 for blowing of heated air toward the central receiving area 72 formed by the heating element 68 and through waste hole 86 provided in base 38 for allowing the cut adhesive strips 14 and terminal ends to be disposed of. In order to more fully understand the present invention, a brief discussion of its operation will now be discussed.

Figure 8:
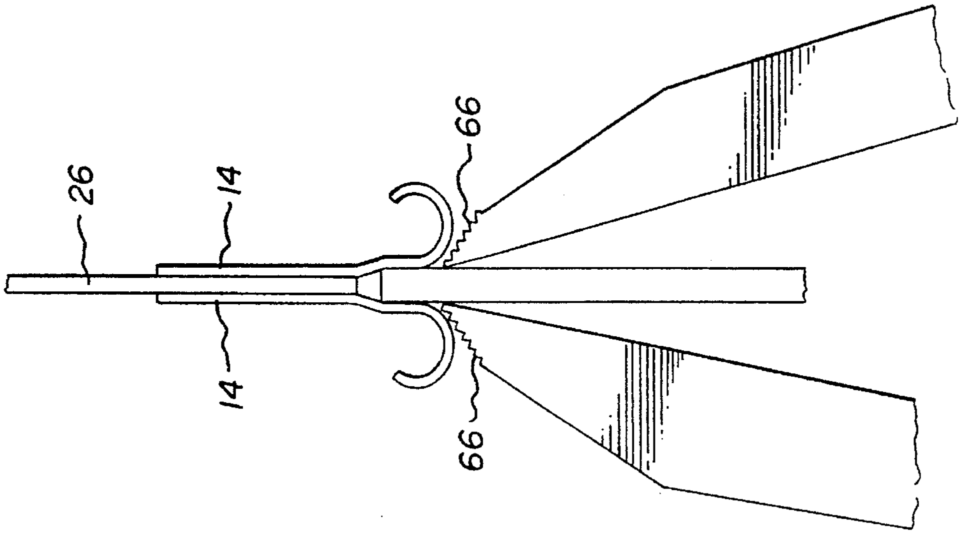
FIG. 8 is a view similar to FIG. 7 illustrating the scraper blade removing the filmstrip from the leader card.
Figure 7:
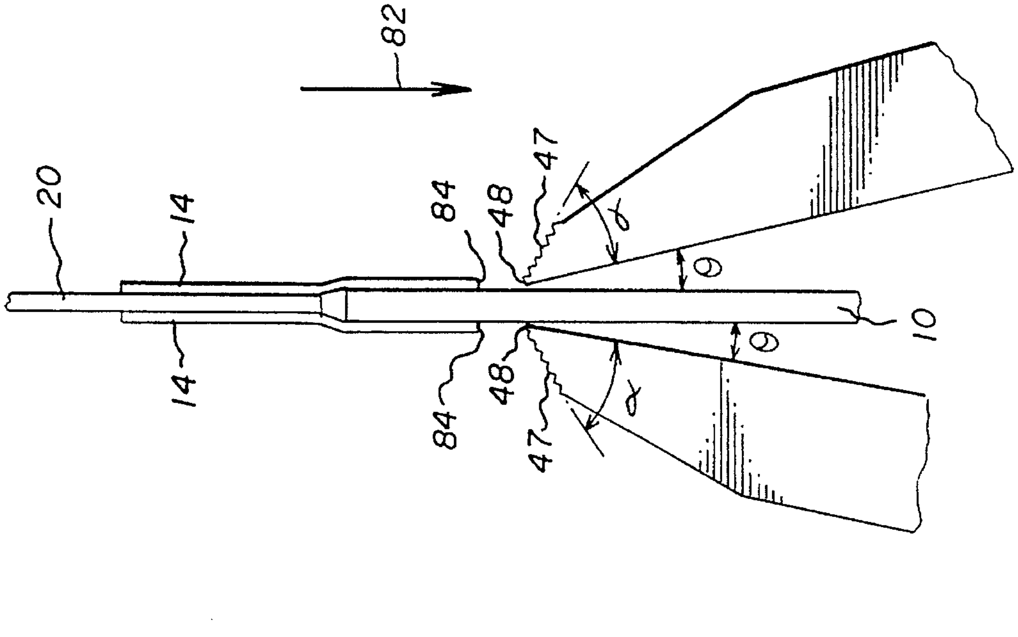
FIG. 7 is an enlarged top plan view illustrating placement of a leader card between the scraper blades prior to removing the filmstrip therefrom.

First, as illustrated in FIG. 3, a leader card 10 having terminal ends 20 attached by adhesive strips 14 is provided, such as illustrated in FIG. 6. The scraper blade 36 is moved about pivot 42 such that a gap is provided between the scraper blades 34,36, as illustrated in FIG. 5. As also illustrated in FIG. 5, the leader card 10 is placed between the blades 34,36 such that the adhesive strips 14 thereon will be positioned between the sets 65,67 of heater element 68, whereby heated air will be blown thereon preheating the adhesive strips 14. Thereafter, as is illustrated in FIG. 7, blade 36 is released and allowed to engage the leader card 10 as illustrated, whereby the scraping edges 48 are biased against the leader card 10 and positioned ahead of the adhesive strips 14 if adhesive strips 14 are present on both sides of the leader card 10. The leader card 10 is then moved in the direction indicated by arrow 82 such that the scraping edge 48 will engage the forward ends 84 of the adhesive strips 14 so as to cause them to be simultaneously scrapped away from the leader card 10 as illustrated in FIG. 8.

Typically, this is done manually by the operator. The leader card 10 is continuously pulled in direction 82 until the terminal ends 20 and adhesive strips 14 are completely removed from the leader card 10. As illustrated in FIG. 8, and previously discussed, the grooves 66 assist in preventing the cut adhesive strips 14 from adhering to the blades 34,36. The residual material removed from leader card 10 will then fall through opening 86, which is assisted by the air flow from fans 70. As can be seen, a single one-step motion is required for quickly and easily removing of the adhesive strips from the leader card 10. The single one-step pull stroke on the leader card 10 also removes all residual material. An important aspect of this is that there is no manual movement of a scraper blade by the operator once the leader card has been placed between scraper blades. All that is done is the operator pulls the leader card 10 in the appropriate direction whereby the blades 34,36 quickly and easily remove the adhesive strips 14.

Figure 9:
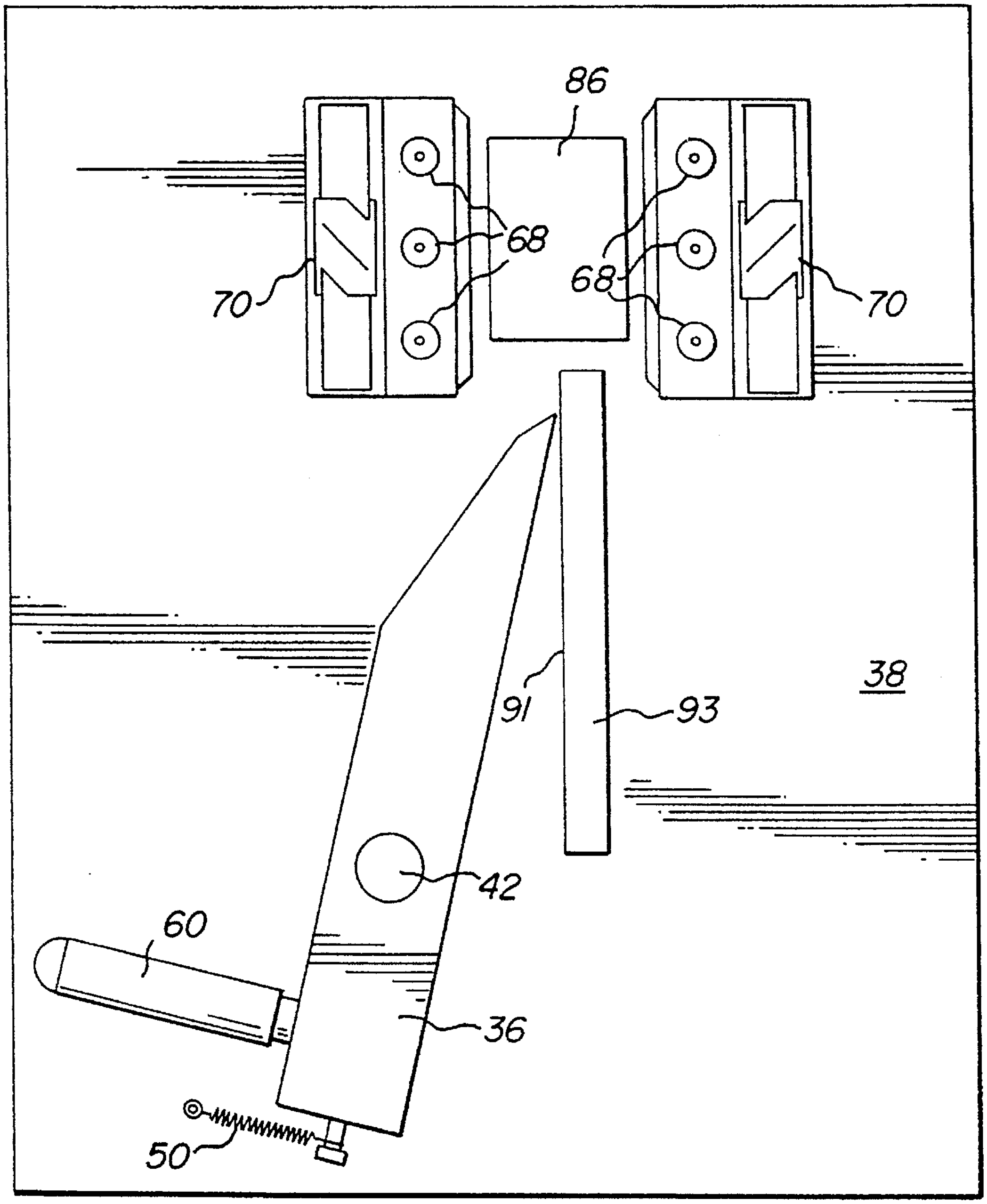
FIG. 9 illustrates a modified apparatus made in accordance with the present invention.

In the particular embodiment illustrated, dual scraper blades 34,36 are provided as adhesive strips 14 are provided on both sides of the leader card 10 and the adhesive strips 14 on both sides can be removed in a single stroke. It is to be understood that if a single adhesive strip is used to secure the film to the leader card, or if it is desired to remove the adhesive strips 14 sequentially from each side of the leader card 10, only a single scraper blade need be provided. The single scraper blade 36 may be biased against a flat surface, such as illustrated in FIG. 9, wherein the scraping edge 48 engages the flat surface 91 of stop 93, like numerals indicating like parts and operation as previously discussed. In this embodiment, the blade 36 is movable. However, the blade 36 may be stationary and the stop movable, or they may both be movably mounted to base 38. The strip of adhesive tape 14 is removed in the same manner as previously discussed with respect to the use of two blades, except that the strip (or strips) on one side of the leader card are removed in a single stroke.

It is also to be understood that various other changes and modifications may be provided without departing from the scope of the present invention. For example, if desired, instead of manually moving the scraper blade 36 by handle 60, an appropriate device, such as a solenoid, may be used for moving of scraper blade 36. Additionally, while in the preferred embodiment, only one of the blades 34,36 are moved, if so desired, both scraper blades may be moved out of engagement to allow even greater access. The blade height may be selected as desired to remove one, two, or however many number of adhesive strips 14 are present on the leader card 10. In the particular embodiment illustrated, since there are two adhesive strips adjacent each other, the blade edge 48 would be sufficiently long such that both strips are removed simultaneously so as to avoid the necessity of pulling the strip through a second time.

In the preferred embodiment illustrated, heating elements are provided for heating of the adhesive present on the adhesive strip 14 as this makes it easier for removal of the adhesive strips 14. Applicants have found that the device works quite satisfactorily without preheating of the adhesive.

It is to be understood that various other changes and modifications may be made without departing from the scope of the present invention. The present invention being limited by the claims set that follow.

PARTS LIST

10 . . . leader card
12 . . . filmstrips

14 . . . adhesive tape
15 . . . images
16 . . . cut-out sections
17 . . . hand tool
20 . . . terminal ends
30 . . . apparatus
34,36 . . . scraper blades
38 . . . base
40 . . . screws
42 . . . pivot
44 . . . inner surface
46 . . . outer surface
47 . . . terminal end section
48 . . . scraping edge
50 . . . spring
52 . . . end
54 . . . anchor
56 . . . rear end
58 . . . end
59 . . . screw
60 . . . handle
62 . . . arrow
65,67 . . . sets of heating elements
66 . . . grooves
68 . . . heating elements
70 . . . fans
72 . . . central receiving area
82 . . . arrow
84 . . . forward ends
86 . . . opening
91 . . . flat surface
93 . . . stop

We claim:

1. An apparatus for separating a leader card from a strip of film that has been adhesively secured to the leader card by a strip of adhesive tape at one end of the leader card, comprising:

a pair of scraper blades, each of said scraper blades having a scraping edge, each of said blades being mounted to said apparatus so that the scraping edges of said blades are in substantial parallel alignment, one of the blades being movably mounted so as to allow separation of the blades and insertion of the leader card therebetween, one of said blades being biased against the other so as to provide a sufficient force such that when the leader card is placed between the blades and pulled past the scraping edges the adhesive tape will be removed from the leader card.

2. An apparatus according to claim 1 wherein said moveable blade is pivotally mounted to said apparatus.

3. An apparatus according to claim 1 wherein heating means is provided for heating of the adhesive strip prior to the leader card being pulled between said scraping edges for removal of the adhesive tape.

4. An apparatus according to claim 1 wherein an opening is provided for allowing residual material to exit the apparatus and disposal thereof.

5. An apparatus according to claim 3 wherein a fan is provided for providing heated air to the leader card placed by said heater.

6. An apparatus according to claim 1 wherein each of the scraper blades adjacent said scraping edge is provided with grooves for minimizing the sticking of residual material to said scraper blades.

7. A method for separating a leader card from a strip of film that has been adhered to the leader card by an adhesive strip of tape, said apparatus having at least one scraper blade having a scraping edge for placement against the surface of the leader card, comprising the steps of:

a) placing the leader card such that the scraping edge is adjacent the surface of the leader card prior to the adhesive tape; and b) pulling the card in a direction such that the scraping edge will remove the adhesive tape from the leader card in a single stroke.

8. The method according to claim 7 further comprising the step of preheating the strip of adhesive tape prior to pulling the leader card past the scraping edge.

9. A method for separating a leader card from a strip of film that has been adhered to the leader card by a pair of adhesive strips of tape, one placed on each side of the leader card, said apparatus having a pair of scraper blades each having a scraping edge, each of said blades being mounted to said apparatus so that the scraping edges of said blades are in substantial parallel alignment and positioned for placement against opposite sides of the leader card, comprising the steps of:

a) placing the leader card such that the scraping edges are adjacent the surface of the leader card prior to the strips of adhesive tape and pulling the card in a direction such that the scraping edges will remove the strips of adhesive tape from the leader card in a single stroke.

10. The method according to claim 9 further comprising the step of preheating the strips of adhesive tape prior to pulling the leader card past the scraping edges.

11. An apparatus for separating a leader card from a strip of film that has been ashesively secured to the leader card by a strip of adhesive tape at one end of the leader card, comprising:

a scraper blade and a mating stop, said scraper blade having a scraping edge, said blade and stop being mounted to said apparatus so that the scraping edge of said blade is biased against said stop, said blade and said stop being mounted to said apparatus so as to allow separation of the scraping edge from the stop so as to allow insertion of the leader card therebetween, said blade being biased against said stop so as to provide a sufficient force such that when the leader card is placed between the blade and stop and pulled past the scraping edge, the adhesive tape will be removed from the leader card.

12. An apparatus according to claim 11 wherein said blade is pivotally mounted to said apparatus.

13. An apparatus according to claim 11 wherein heating means is provided for heating of the adhesive strip prior to the leader card being pulled past said scraping edge for removal of the strip of adhesive tape.

14. An apparatus according to claim 11 wherein an opening is provided for allowing residual material to exit the apparatus and disposal thereof.

15. An apparatus according to claim 13 wherein a fan is provided for providing heated air to the leader card placed by said heater.

16. An apparatus according to claim 11 wherein said blade is provided with grooves adjacent said scraping edge for minimizing the sticking of residual material to said scraper blades.

17. An apparatus for separating a leader card from a strip of film that has been adhesively secured to the leader card by a strip of adhesive tape at one end of the leader card, said apparatus comprising at least one scraper blade having a scraping edge, said blade being mounted to the apparatus so that the scraping edge of said blade is biased against the surface of the leader card so that when the adhesive tape secured to the leader card is moved past the scraping edge, the adhesive tape will be removed from the leader card in a single stroke.

18. An apparatus according to claim 17 wherein said blade is pivotally mounted to said apparatus.

19. An apparatus according to claim 17 wherein heating means is provided for heating of the adhesive strip prior to the leader card being pulled past said scraping edge for removal of the strip of adhesive tape.

20. An apparatus according to claim 17 wherein an opening is provided for allowing residual material to exit the apparatus and disposal thereof.

21. An apparatus according to claim 19 wherein a fan is provided for providing heated air to the leader card placed by said heater.

22. An apparatus according to claim 17 wherein said blade adjacent the scraping edge is provided with grooves for minimizing sticking of residual material to said scraper blades.

* * * * *

UNITED STATES PATENT AND TRADEMARK OFFICE

CERTIFICATE OF CORRECTION

PATENT NO. : 5,608,487
DATED : March 4, 1997
INVENTOR(S) : Brett Pierce et al.

It is certified that error appears in the above-identified patent and that said Letters Patent is hereby corrected as shown below:

| | | | |
|---|---|---|---|
| Title Page - Item [56] - References Cited | Add to U.S. PATENT DOCUMENTS: | | |
| | 2,707,299 | 5/1955 | Steindorf et al. |
| | 5,373,339 | 12/1994 | Greene et al. |
| Column 6, line 31 | "ashesively" should read --adhesively-- | | |

Signed and Sealed this

Nineteenth Day of May, 1998

Attest:

BRUCE LEHMAN

*Attesting Officer*

*Commissioner of Patents and Trademarks*